C. W. SIEVERT.
CLUTCH MECHANISM.
APPLICATION FILED SEPT. 19, 1918.
1,355,280.
Patented Oct. 12, 1920.
2 SHEETS—SHEET 1.
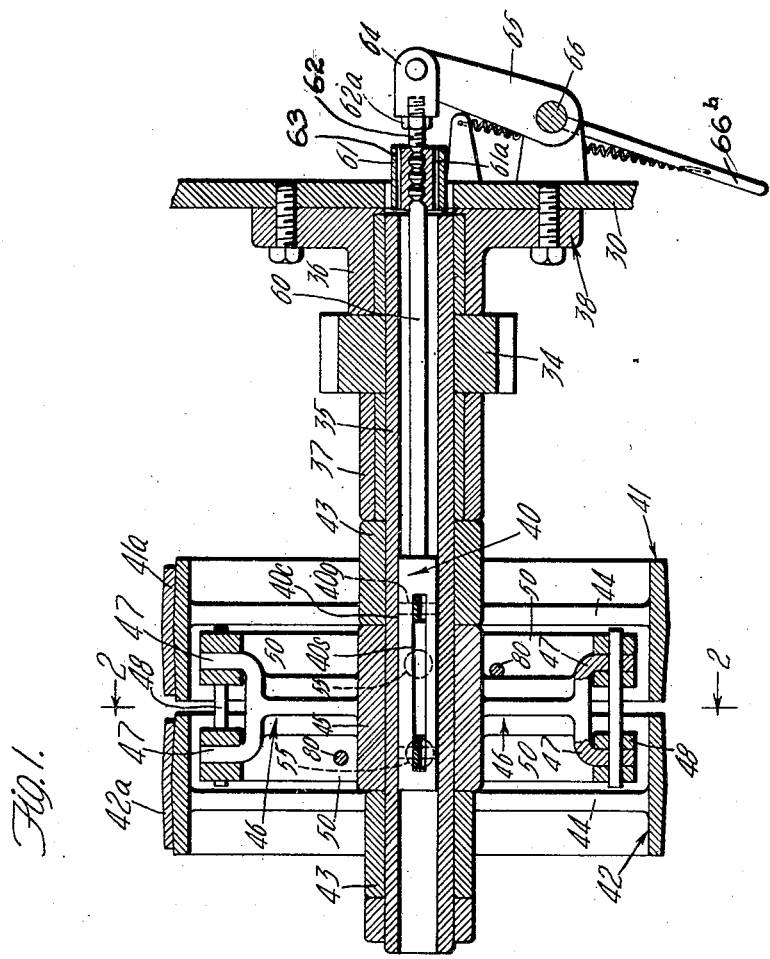
Fig. 1.
Inventor
Charles W. Sievert
by
his Attorney.

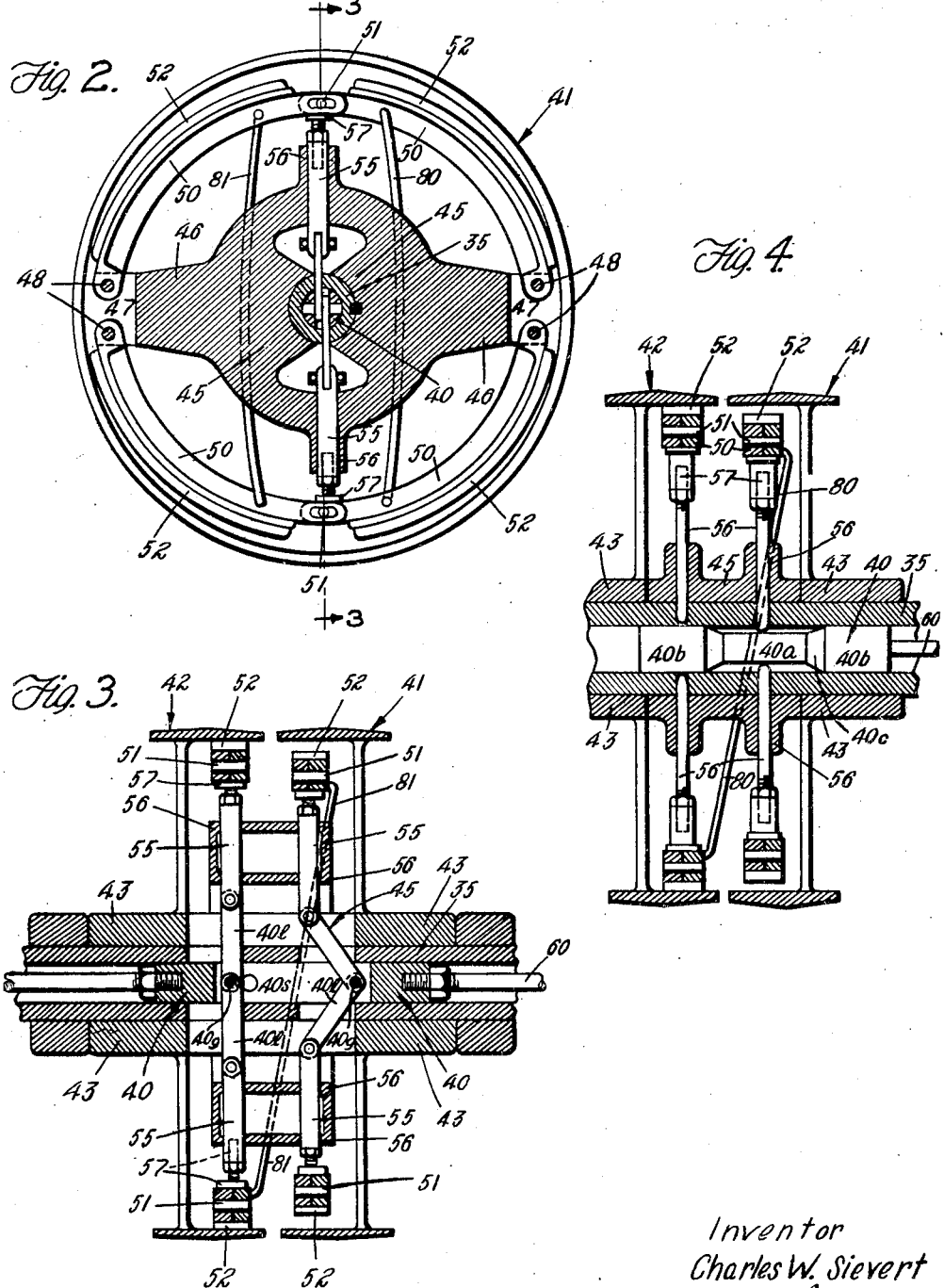

UNITED STATES PATENT OFFICE.

CHARLES W. SIEVERT, OF LOS ANGELES, CALIFORNIA.

CLUTCH MECHANISM.

1,355,280.   Specification of Letters Patent.   Patented Oct. 12, 1920.

Application filed September 19, 1918. Serial No. 254,842.

*To all whom it may concern:*

Be it known that I, CHARLES W. SIEVERT, a citizen of the United States, residing at Los Angeles, in the county of Los Angeles, State of California, have invented new and useful Improvements in Clutch Mechanisms, of which the following is a specification.

This invention relates generally to clutch mechanisms, and more particularly to a clutch mechanism adapted for operation where a periodically reversing motion is desired to be obtained.

There are several objects of the invention; but these may be preliminarily briefly summed up in the general object of the invention which is to provide an efficient form of reversing clutch mechanism which will give quick and accurate reversal of movement, capable of transmitting a large amount of power, and having long life; also simple in its mechanism, operation and adjustment. In clutch mechanisms designed to produce an automtically reversing movement, the clutching surfaces, and the moving parts of the mechanism generally, are subjected to a great deal of constant wear and tear; with the result that many clutch mechanisms wear out in a short time, or the clutching surfaces must be replaced frequently. It is a general object of this invention to overcome such difficulties.

The invention will be best understood from the following detailed description of a preferred form of mechanism embodying the invention, reference being had to the accompanying drawings in which—

Figure 1 is a horizontal longitudinal central section of one form of my clutch mechanism; Fig. 2 is a vertical section on line 2—2 of Fig. 1; Fig. 3 is a vertical section on line 3—3 of Fig. 2; and Fig. 4 is a view similar to Fig. 3 showing a modified form.

In the drawings a part 30 is shown supporting a bracket 38 which supports the clutch mechanism. Clutch shaft 35 is journaled in bearings 36 and 37, and between these bearings the shaft carries a driving gear 34. This gear may of course typify any similar member. Its placement between the two bearings prevents end movement of the clutch shaft.

Bearings 36 and 37 are preferably amply long and spaced far enough apart, (with pinion 34 between them), so as to give good support to the clutch shaft 35. Clutch shaft 35 has a longitudinal bore, preferably from end to end, and in this longitudinal bore there is a reciprocable clutch actuating slider 40, the construction and action of which will be hereinafter described. There are two belt pulleys mounted upon the clutch shaft. It will be understood that these belt pulleys typify any suitable driving means, rotating in opposite directions, but in the present embodiment of my invention I preferably use belt pulleys rather than gears, sprockets, or the like. So I utilize two belt pulleys 41 and 42 whose hubs 43 are loosely mounted on the shaft 35. The spokes 44 of these pulleys are preferably off the center of their rims; and hubs 43 are preferably entirely on the outer sides of the spokes; leaving the space between the spokes of the two pulleys for the mounting of clutch hub 45 on shaft 35, this hub being tightly mounted on the shaft to revolve therewith at all times. Hub 45 carries two opposite radial arms 46, each of which is bifurcated at its end to provide a pair of spaced mounting lugs 47. Each mounting lug provides means for the pivotal mounting at 48, 48, of two segmental clutch members 50. It will be readily understood from the drawings that there are two sets of these segmental clutch members 50, and four members in each set, each set of segmental clutch members being mounted within the rim of one of the driving pulleys 41 or 42. Each set of members comprises two pairs; and the abutting or overlapping ends of the members 50 of each pair are connected together at 51 by a pin and slot connection. Each member 50 has an outer facing 52 of leather or other suitable friction material; and the shape of members 50 is such that, when they are pressed outwardly at the point 51 (swinging outwardly about their pivot at 48) their leather facings will be thrown into complete and forcible contact with the inner surface of the driving pulley. It is a function of reciprocating member 40 to alternately expand the two sets of clutch members 50. Slider member 40 is slotted as shown at $40^s$ and carries two transverse pivot pins $40^g$ to which two pairs of links $40^e$ are pivoted, these links connecting to the push pins 55 as illustrated. There are four of these push pins, two for each set of clutch members 50; and the two in each set are mounted oppositely in bearing bosses 56, these bosses being mounted on and integral with clutch hub 45. They carry adjustable tappets 57 on their outer ends, which bear against members 50 at their pivotally connected ends (at 51). It will be readily seen that by shifting member 40, either one of the sets of push pins 55 may be pushed radially outwardly and thereby push the clutch members 50 outwardly to expand the clutch members against the inner surface of the pulley rim. And it will be readily seen that when one set of push pins 55 is pushed outwardly, the other set is allowed to move inwardly. In other words, by moving member 40 back and forth, the two sets of clutch members may be alternately expanded and contracted, so as to drivingly connect either one of pulleys 41 or 42 with the shaft 35; this driving connection being effected through the clutch members 50 and through their pivotal connection with the arms 46 which are carried by hub 45 mounted upon the shaft 35. And when slider 40 is in a medial position, both sets of clutch members will be retracted from contact with the pulley rims.

Member 40 has a rod 60 which projects through the hollow shaft 35 and to the interior of frame 30, where it is connected by a swivel joint 61 with another rod 62 which is adjustably screw-threaded and locknutted at 62$^a$ to a member 64 pivoted to arm 65 mounted upon rock shaft 66. The swivel joint at 61, which allows member 40 to turn with shaft 35 and with the pins 55, may be easily made by turning some circumferential V-shaped grooves in the ends of rods 60 and 62 and then casting a Babbitt metal sleeve around the grooved ends of the rod. Some longitudinal wire 63, cast into the Babbitt sleeve will strengthen it longitudinally.

The two pulleys 41 and 42 are constantly rotated in opposite directions. This may be done in any convenient or well known manner, as by driving, from a motor, with straight and crossed belts. It will be apparent that movement of rod 60 to the left in the drawings will cause the left hand set of pins 55 to move inwardly and the right hand set to move outwardly, expanding the set of clutch members 50 at the right and contracting those at the left. This will cause belt pulley 41 to be then connected with the shaft 35 and cause belt pulley 42 to be loose. Opposite movement of rod 60 will correspondingly cause pulley 42 to be drivingly connected with the shaft and pulley 41 to be loose.

Now it is a feature of this clutch mechanism that when one set of clutch members 50 is positively expanded in the manner thus explained, the other set is positively contracted (that is, I do not depend upon a negative action of merely allowing the other set of clutch members to contract, but I positively contract them). In order to positively cause contraction of one set of clutch members when the other set expands, I provide a cross connection between the different sets of clutch members. There are two cross connection rods 80 and 81. Rod 80 connects with one of the members 50 of one set and extends generally diametrically across the clutch mechanism and connects them at its opposite end with a member 50 of the other set; both the connections to the members 50 being made near the pin and slot connection 51—that is near the free ends of those members. Similarly rod 81 connects at one end to one of the members 50 of the last mentioned set (the one shown at the left in Figs. 1, 3 and 4) and at the other end connects with one of the members 50 of the first mentioned set (the one shown at the right in the drawings). It will thus be seen that opposite members 50 of the two sets are cross connected. The result is that when the members 50 of one set are expanded, the members 50 of the other set are necessarily forcibly contracted. This interconnection does away with the necessity of having any springs in the clutch mechanism, and makes both expansion and contraction positive and forcible. This fact, taken in connection with the fact that the friction surfaces are comparatively large, being on a large diameter, give the clutch a quick positive action; so that the reversal of movement is accomplished almost instantaneously after the handle 66$^b$ is thrown over. These facts are also true of the modified form of mechanism shown in Fig. 4. Here the push pins 56 engage directly with the slider 40 which has a central reduced portion 40$^a$ and conical parts 40$^c$ leading to enlarged end parts 40$^b$. The slider has a wedge or cam action in this case and acts the same as before described, by moving to the left and right in Fig. 4. In central position both sets of pins are relieved from outward pressure. Member 40 and the pins 55 may be hardened.

The shaft 66 may be equipped with a trip-over mechanism which may conveniently be of the form shown in Fig. 1. Shaft 66 has a handle 66$^b$ in any convenient position to be manually operated. This handle affords convenient means for the operator to throw shaft 66 from one position to the other, or to its neutral position, and thereby to control completely the action of the clutch mechanism. A tension spring is connected to handle 66$^b$ and connected to the frame of the machine in such a way that the handle throws the spring "over center" in moving from one position to the other. This spring has the effect of moving shaft 66 to and holding it in its final terminal position, at one position or the other, and thus holds the clutch mechanism surely in either position in which it may be set. This trip-over mechanism, however, may or may not be used as desired; it will be noted that the clutch mechanism itself so acts that it has no tendency to move out of either of its two positions.

Having described a preferred form of my invention, what I claim is:

1. In a clutch mechanism of the character described, a driven clutch member mounted upon a shaft, a pair of driving members loosely mounted upon the shaft, a pair of expansible friction means one within each driving member, means to expand either one or the other of said expansible friction means, and inter-connections between the two friction means, separate from and acting independently of the expanding means, whereby when one is expanded the other is positively contracted.

2. In a clutch mechanism of the character described, a shaft, a driven clutch member mounted upon the shaft, a pair of driving members loosely mounted upon the shaft, a pair of expansible friction means one within each driving member, means to expand either one or the other of said expansible friction means, and interconnections between the two friction means, separate from and acting independently of the expanding means, whereby when the one is expanded the other is positively contracted; said expanding means embodying a longitudinally movable slider within said shaft and radially movable members operatively connected with said longitudinally movable slider at their inner ends and at their outer ends engaging said expansible friction means.

3. In a clutch mechanism of the character described, a hollow shaft, a hub rigidly mounted on said shaft, a pair of driving pulleys one mounted loosely on the shaft at each side of the hub, and the outer rims of said pulleys overhanging said hub, a pair of opposite radial arms carried by said hub, sets of pivoted segmental friction clutch members carried on the ends of said arms, one set for and within each of the pulley rims, each set of said members comprising four of such members, and two opposite members of each set meeting and being connected together by pin and slot connections; a pair of oppositely disposed radial pusher pins for each of the sets of clutch members, said pusher pins extending radially through said hub and outwardly and engaging the friction clutch members at their point of connection together by said pin and slot connection; and a longitudinally movable slider in the shaft connected to the pusher pins to cause their radial movement by virtue of longitudinal movement of the member.

4. In a clutch mechanism of the character described, a hollow shaft, a hub rigidly mounted on said shaft, a pair of driving pulleys one mounted loosely on the shaft at each side of the hub, and the outer rims of said pulleys overhanging said hub, a pair of opposite radial arms carried by said hub, sets of pivoted segmental friction clutch members carried on the ends of said arms, one set for and within each of the pulley rims, each set of said members comprising four of such members, and two opposite members of each set meeting and being connected together by pin and slot connections; a pair of oppositely disposed radial pusher pins for each of the sets of clutch members, said pusher pins extending radially through said hub and outwardly and engaging the friction clutch members at their point of connection together by said pin and slot connection; a longitudinally movable slider in the shaft connected to the pusher pins; and interconnection between the friction clutch members of the two sets whereby when one is expanded the other is positively contracted.

5. In a clutch mechanism, a driven clutch member, a pair of driving members normally freely rotatable relative to the driven member, a pair of mechanisms adapted severally to connect the several driving members to the driven member, means to move each of the mechanisms to operative connecting position, and interconnection between the two mechanisms, separate from and acting independently of the last mentioned means whereby when one mechanism is moved to operative connecting position the other is positively moved to and held in inoperative position.

In witness that I claim the foregoing I have hereunto subscribed my name this 13th day of September, 1918.

CHARLES W. SIEVERT.

Witness:
VIRGINIA I. BERINGER.